US012701112B2

(12) United States Patent
Peddada

(10) Patent No.: US 12,701,112 B2
(45) Date of Patent: *Aug. 4, 2026

(54) HARDWARE-BACKED PASSWORD SECURITY FOR CLOUD SYSTEMS

(71) Applicant: Salesforce, Inc., San Francisco, CA (US)

(72) Inventor: Prasad Peddada, Alameda, CA (US)

(73) Assignee: Salesforce, Inc., San Francisco, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/426,147

(22) Filed: Jan. 29, 2024

(65) Prior Publication Data

US 2024/0422150 A1     Dec. 19, 2024

Related U.S. Application Data

(60) Provisional application No. 63/523,911, filed on Jun. 28, 2023, provisional application No. 63/521,562, filed on Jun. 16, 2023.

(51) Int. Cl.
 *H04L 9/40*       (2022.01)
 *H04L 9/08*       (2006.01)
 *H04L 9/32*       (2006.01)

(52) U.S. Cl.
 CPC .......... *H04L 63/083* (2013.01); *H04L 9/0825* (2013.01); *H04L 9/3226* (2013.01); *H04L 63/0442* (2013.01)

(58) Field of Classification Search
 CPC .................................................... H04L 63/083
 See application file for complete search history.

(56) References Cited

U.S. PATENT DOCUMENTS

| | | | |
|---|---|---|---|
| 7,685,430 B1 | 3/2010 | Masurkar | |
| 8,850,219 B2 | 9/2014 | Dapkus et al. | |
| 9,491,164 B1 * | 11/2016 | Fay ....................... | H04L 63/083 |
| 9,608,809 B1 | 3/2017 | Ghetti et al. | |
| 9,614,670 B1 | 4/2017 | Ghetti et al. | |
| 10,230,529 B2 * | 3/2019 | Costa ...................... | G06F 21/62 |
| 10,356,088 B1 * | 7/2019 | Peddada ............... | H04L 9/3213 |
| 10,567,167 B1 | 2/2020 | Ghetti et al. | |
| 10,637,658 B2 | 4/2020 | Peddada et al. | |
| 11,522,686 B2 * | 12/2022 | Peddada ............... | H04L 9/3066 |
| 2011/0283110 A1 | 11/2011 | Dapkus et al. | |

(Continued)

*Primary Examiner* — Simon P Kanaan
(74) *Attorney, Agent, or Firm* — Holland & Hart, LLP.

(57) ABSTRACT

A method of data processing is described. The method includes receiving, at a server host, a login request that includes a clear text password for an account. The method further includes retrieving, from a database, a payload stored in association with the account. The payload may indicate a hash value of a user configured password for the account, a hashing algorithm used for generation of the hash value, an initialization vector, and a key agreement public key associated with the account. The payload may be encrypted using a secret key derived from the key agreement public key and a private key provisioned to a key protection component of the server host. The method further includes transmitting a request that includes the payload and the clear text password. The method further includes receiving a response that indicates whether the clear text password corresponds to the user configured password.

20 Claims, 11 Drawing Sheets

Provisioning

200

(56)     References Cited

U.S. PATENT DOCUMENTS

| | | | |
|---|---|---|---|
| 2015/0318986 A1* | 11/2015 | Novak | H04L 9/0894 |
| | | | 713/189 |
| 2017/0346797 A1* | 11/2017 | Yedidi | H04L 63/14 |
| 2018/0212762 A1 | 7/2018 | Peddada et al. | |
| 2018/0212785 A1 | 7/2018 | Peddada et al. | |
| 2018/0262485 A1 | 9/2018 | Roth et al. | |
| 2019/0052456 A1* | 2/2019 | Bygrave | G06F 21/6209 |
| 2019/0229908 A1* | 7/2019 | Peddada | G06F 21/602 |
| 2019/0280860 A1 | 9/2019 | Peddada et al. | |
| 2020/0127826 A1 | 4/2020 | Ebrahimi et al. | |
| 2020/0137105 A1* | 4/2020 | Endler | G06F 21/6218 |
| 2020/0137109 A1* | 4/2020 | Endler | H04L 63/1433 |
| 2020/0162451 A1 | 5/2020 | Alhawaj et al. | |
| 2020/0244636 A1 | 7/2020 | Varanasi et al. | |
| 2022/0029802 A1 | 1/2022 | Ebrahimi et al. | |
| 2022/0247554 A1* | 8/2022 | Peddada | H04L 9/0897 |
| 2023/0342277 A1* | 10/2023 | Rosati | H04L 9/3247 |
| 2024/0073032 A1* | 2/2024 | Sterbling | G06F 21/606 |
| 2024/0323034 A1* | 9/2024 | Kumar | H04L 9/3268 |
| 2024/0422000 A1* | 12/2024 | Peddada | H04L 9/3226 |
| 2024/0422150 A1* | 12/2024 | Peddada | H04L 9/0863 |

* cited by examiner

Provisioning

200

Figure 2C:
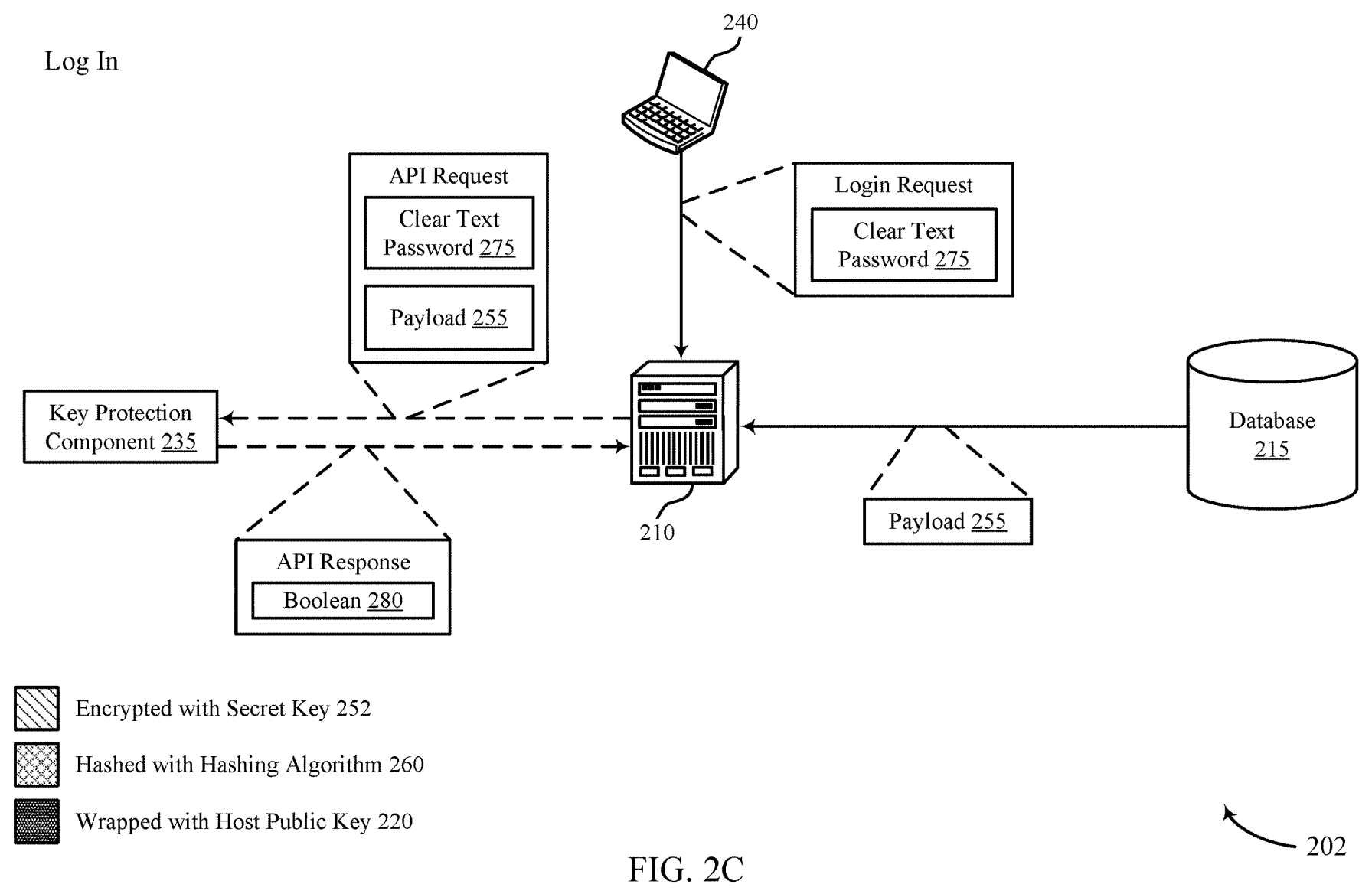

Log In

240

Login Request

Clear Text
Password 275

210

Database
215

Payload 255

API Request

Clear Text
Password 275

Payload 255

Key Protection
Component 235

API Response

Boolean 280

202

Encrypted with Secret Key 252

Hashed with Hashing Algorithm 260

Wrapped with Host Public Key 220

Login Request

210

365

Payload

API Request

API Response

Key Protection Component 235

370

Database 215

360

Log In

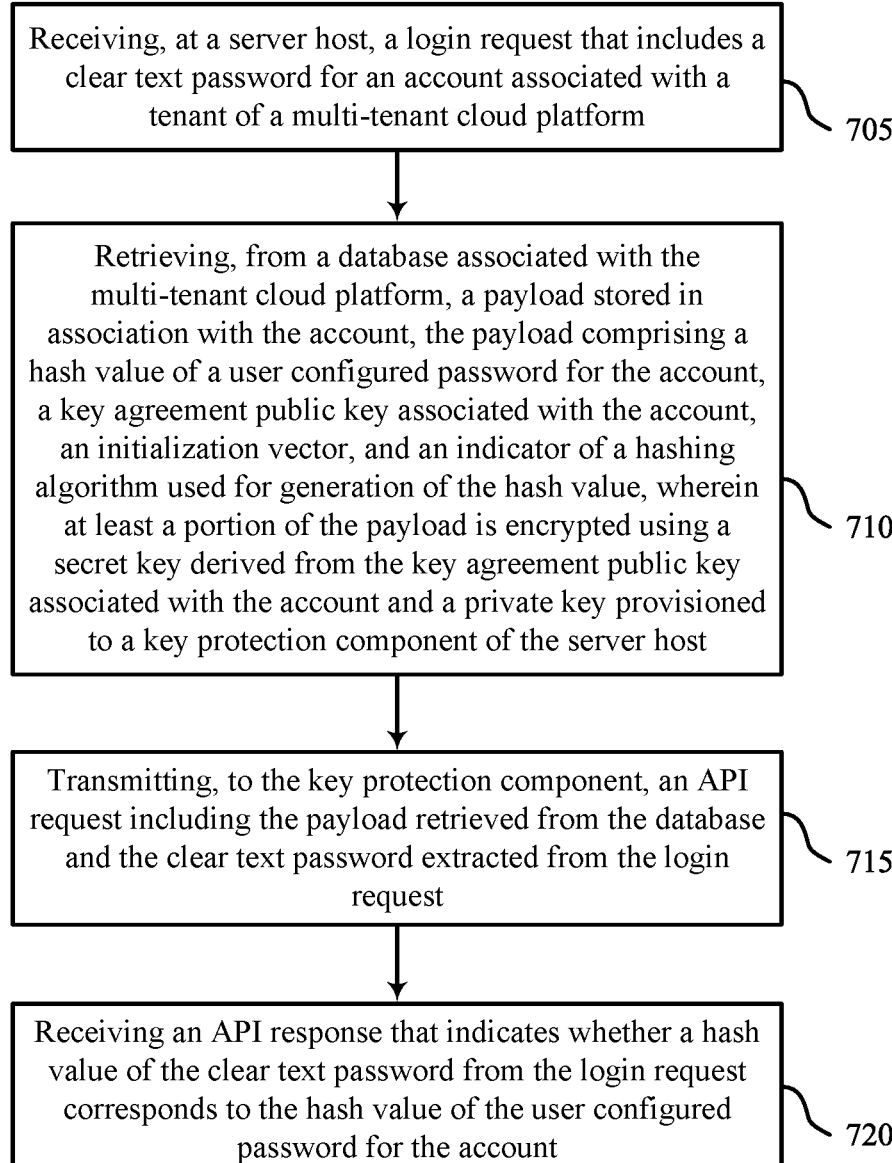

Receiving, at a server host, a login request that includes a clear text password for an account associated with a tenant of a multi-tenant cloud platform

705

Retrieving, from a database associated with the multi-tenant cloud platform, a payload stored in association with the account, the payload comprising a hash value of a user configured password for the account, a key agreement public key associated with the account, an initialization vector, and an indicator of a hashing algorithm used for generation of the hash value, wherein at least a portion of the payload is encrypted using a secret key derived from the key agreement public key associated with the account and a private key provisioned to a key protection component of the server host

710

Transmitting, to the key protection component, an API request including the payload retrieved from the database and the clear text password extracted from the login request

715

Receiving an API response that indicates whether a hash value of the clear text password from the login request corresponds to the hash value of the user configured password for the account

HARDWARE-BACKED PASSWORD SECURITY FOR CLOUD SYSTEMS

CROSS REFERENCE

The present Application for Patent claims priority to and the benefit of U.S. Provisional Application No. 63/521,562 by Peddada et al., entitled "HARDWARE-BACKED PASSWORD SECURITY FOR CLOUD SYSTEMS," filed Jun. 16, 2023 and U.S. Provisional Application No. 63/523,911 by Peddada et al., entitled "HARDWARE-BACKED PASSWORD SECURITY FOR CLOUD SYSTEMS," filed Jun. 28, 2023, each of which are assigned to the assignee hereof, and are expressly incorporated by reference in their entirety herein.

FIELD OF TECHNOLOGY

The present disclosure relates generally to database systems and data processing, and more specifically to hardware-backed password security for cloud systems.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may use hashing techniques to securely store and manage account information (such as passwords). However, as password cracking schemes improve and security standards evolve, keeping all sensitive information protected and up to date may be time consuming and computationally expensive.

BRIEF DESCRIPTION OF THE DRAWINGS

FIGS. 2A, 2B, and 2C show examples of computing systems that support hardware backed password security for cloud systems in accordance with aspects of the present disclosure.

FIGS. 3A, 3B, and 3C show examples of process flows that support hardware backed password security for cloud systems in accordance with aspects of the present disclosure.

FIG. 7 shows a flowchart illustrating methods that support hardware-backed password security for cloud systems in accordance with aspects of the present disclosure.

DETAILED DESCRIPTION

Figure 1:
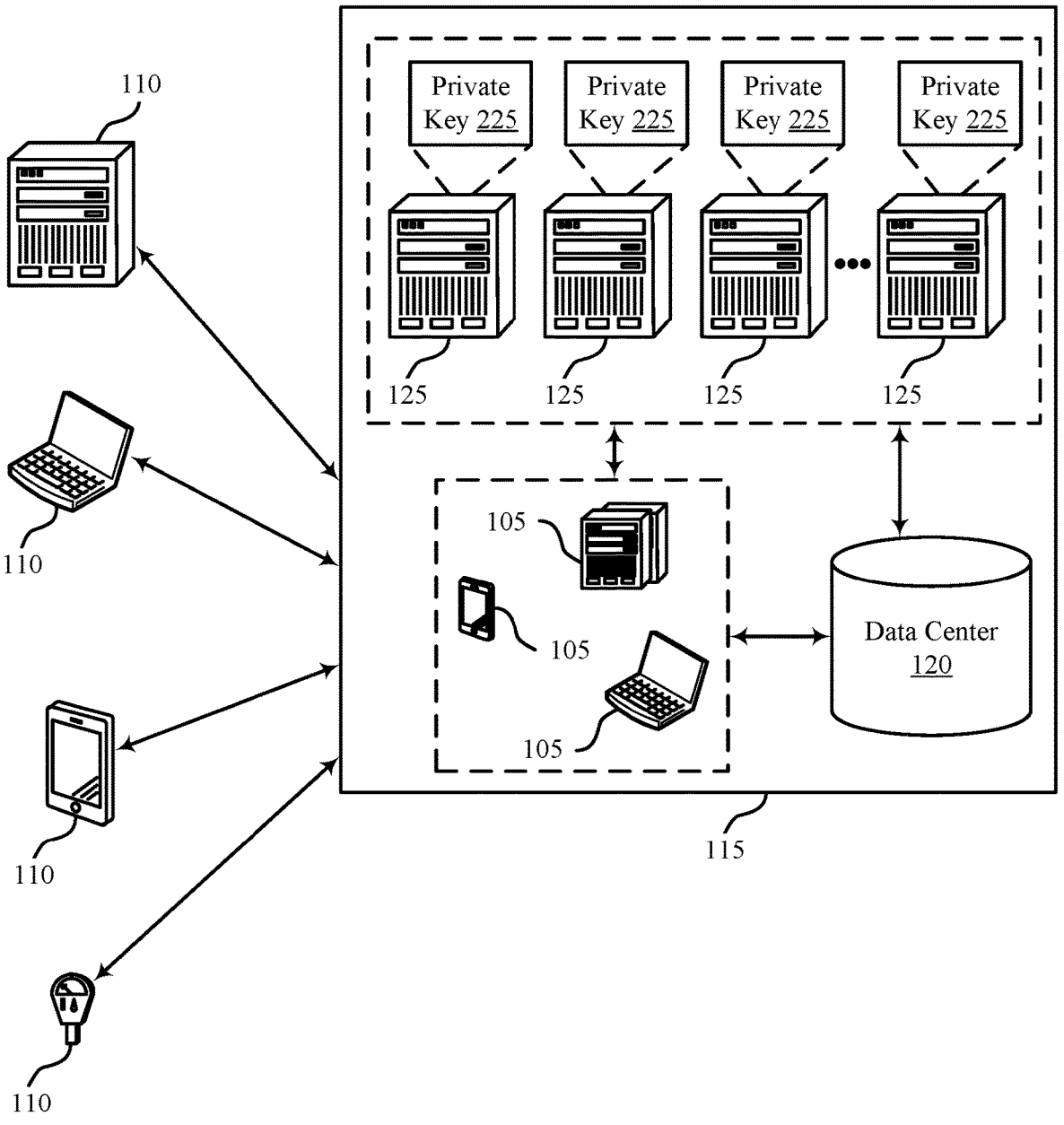
FIG. 1 illustrates an example of a computing system that supports hardware-backed password security for cloud systems in accordance with aspects of the present disclosure.

A multi-tenant cloud system may store and manage login credentials (such as usernames and passwords) for a large number of users. To ensure that sensitive account information (such as user configured passwords) are securely stored and protected, the multi-tenant cloud system may use cryptographic hashing, which involves the use of a mathematical function (also referred to as a hash function or a hashing algorithm) that takes an input (i.e., a clear text password) and produces a fixed-size output, such as an array of bytes. The purpose of password hashing is to prevent plain text passwords (equivalently referred to as clear text passwords) from being stored or transmitted within the multi-tenant cloud system, since plain text passwords are vulnerable to theft or misuse if compromised. Instead, the password may be transformed into a hash value, which is typically a fixed-length string of characters that is unique to the password input.

The same password input will always produce the same hash value, but it is computationally infeasible to reverse the process and obtain the original password from the resulting hash value. Storing hash values (instead of the plain text passwords themselves) in a database may prevent malicious actors (i.e., attackers) from accessing or extracting plain text passwords from the database in the event of a data breach. However, if there is a need to switch from one hashing algorithm/scheme to another, updating all existing hash values (without knowing the corresponding plain text passwords) may be error-prone, and/or may cause service interruption if not done properly.

The techniques described herein provide for using hardware-based encryption to securely store and access passwords within a multi-tenant cloud system. In accordance with one or more aspects of the present disclosure, a server host (such as an application server) may receive a login request that includes a clear text password for an account associated with a tenant of the multi-tenant cloud system. The server host may retrieve a payload associated with the account. The payload may include a hash value of a user configured password for the account, an indication of a hashing algorithm used for generation of the hash value, a key agreement public key associated with the account, and an initialization vector. A portion of the payload (i.e., the hash value and the indication of the hashing algorithm) may be encrypted with a secret key derived from the key agreement public key and a private key provisioned to a key protection component of the server host. The server host may transmit, to the key protection component, an application programming interface (API) request that includes the payload and the clear text password from the login request. The key protection component may use the information provided by the server host to determine whether the clear text password matches the user configured password.

As used herein, the terms "wrapping" and "wrapped" refer to the cryptographic process of using symmetric encryption algorithms known as key wrap constructions to encapsulate (i.e., wrap) cryptographic key material. Although some implementations of the subject matter described in this disclosure can be accomplished using key wrapping techniques, it is to be understood that other approaches (such as key agreement approaches) can also be used to accomplish substantially the same result. For example, in accordance with a key agreement approach, two parties or systems may be associated with respective elliptic-curve key pair, and the two parties or systems may derive a shared secret using a key agreement scheme, such as an Elliptic Curve Diffie-Hellman (ECDH) Key Exchange scheme. The shared secret may be used as or serve as the basis of a key, such as the secret key used for encryption of the payload.

In some examples, the private key may be provisioned by a key distribution service associated with the multi-tenant cloud system. For example, the key distribution service may generate the private key, use the private key to generate a certificate signing request (CSR), and send the CSR to a certificate authority (CA) associated with the multi-tenant cloud system. In turn, the CA may issue a digital certificate associated with the private key. Thereafter, the key distribution service may wrap the private key with a host public key (provided by the server host) and store both the digital certificate and the wrapped private key in a database accessible to the server host.

Aspects of the present disclosure may be implemented to realize one or more of the following advantages. In some implementations, using a hardware-based encryption scheme to store passwords within a multi-tenant cloud system may reduce the likelihood of sensitive information (such as passwords) being stolen, compromised, intercepted, etc. Accordingly, the described techniques may improve the overall security of the multi-tenant cloud system by ensuring that passwords cannot be cracked (i.e., deciphered) by attackers. The techniques described herein may also promote greater resilience and scalability, as the same private key can be used to securely encrypt a large number of passwords. Furthermore, even though the public key associated with a particular account may be accessible, the underlying passwords cannot be decrypted without knowing the private key protected by hardware.

Aspects of the disclosure are initially described in the context of computing systems and process flows. Aspects of the disclosure are further illustrated by and described with reference to apparatus diagrams, system diagrams, and flowcharts that relate to hardware-backed password security for cloud systems.

FIG. 1 illustrates an example of a computing system 100 for cloud computing that supports hardware-backed password security for cloud systems in accordance with various aspects of the present disclosure. The computing system 100 includes cloud clients 105, contacts 110, cloud platform 115, and data center 120. Cloud platform 115 may be an example of a public or private cloud network. A cloud client 105 may access cloud platform 115 over a network connection. The network may implement transfer control protocol and internet protocol (TCP/IP), such as the Internet, or may implement other network protocols. A cloud client 105 may be an example of a user device, such as a server, a smartphone, or a laptop. In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions may include communications, opportunities, purchases, sales, or any other interaction between a cloud client 105 and a contact 110. Data may be associated with the interactions. A cloud client 105 may access cloud platform 115 to store, manage, and process the data associated with the interactions. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction. The interaction may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server, a laptop, a smartphone, or a sensor. In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client—server systems, mobile device systems, and mobile network systems. In some cases, cloud platform 115 may support customer relationship management (CRM) solutions. This may include support for sales, service, marketing, community, analytics, applications, and the Internet of Things. Cloud platform 115 may receive data associated with contact interactions from the cloud client 105 over a network connection, and may store and analyze the data. In some cases, cloud platform 115 may receive data directly from an interaction between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via a connection, or directly from the cloud client 105 or an interaction between a contact 110 and the cloud client 105. Data center 120 may utilize multiple redundancies for security purposes. In some cases, the data stored at data center 120 may be backed up by copies of the data at a different data center (not pictured).

A subsystem (e.g., pod) may include cloud clients 105, cloud platform 115, and data center 120. In some cases, data processing may occur at any of the components of a subsystem, or at a combination of these components. In some cases, servers may perform the data processing. The servers may be a cloud client 105 or located at data center 120.

The computing system 100 may be an example of a multi-tenant system. For example, the computing system 100 may store data and provide applications, solutions, or any other functionality for multiple tenants concurrently. A tenant may be an example of a group of users (e.g., an organization) associated with a same tenant identifier (ID) who share access, privileges, or both for the computing system 100. The computing system 100 may effectively separate data and processes for a first tenant from data and processes for other tenants using a system architecture, logic, or both that support secure multi-tenancy. In some examples, the computing system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the computing system 100 may run a single instance of software on a processing device (e.g., a server, server cluster, virtual machine) to serve multiple tenants. Such a multi-tenant system may provide for efficient integrations (e.g., using APIs) by applying the integrations to the same software application and underlying architectures supporting multiple tenants. In some cases, processing resources, memory resources, or both may be shared by multiple tenants.

As described herein, the computing system 100 may support any configuration for providing multi-tenant functionality. For example, the computing system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The computing system 100 may support scaling of tenants within the multi-tenant system, for example, using scale triggers, automatic scaling procedures, scaling requests, or any combination thereof. In some cases, the computing system 100 may implement one or more scaling rules to enable relatively fair sharing of resources across tenants. For example, a tenant may have a threshold quantity of processing resources, memory resources, or both to use, which in some cases may be tied to a subscription by the tenant.

As described herein, passwords may be hashed and stored. Hashing is a one-way function. A hashed password cannot be used to enter into an application's password field. Examples of hashing algorithms include a 256-bit secure hashing algorithm (SHA-256), a 512-bit secure hashing algorithm (SHA-512), password-based key derivation function (PBKDF2), etc. Storing passwords securely is a technical challenge. In some cases, the hashing scheme used to secure passwords may be surpassed by advancements in central processing unit (CPU) and/or graphic processing unit (GPU) updates. Some systems may use a password-based key derivation function (PBKDF) with a specific iteration count. As the iteration count increases, so do the computing costs associated with keeping the information secure.

Attackers crack (i.e., decipher) passwords by selecting a password that a victim (i.e., user) has chosen, calculating a hash value of the selected password, and comparing the calculated hash value to the hash value of the victim's password. If the two hashes match, the attacker has successfully cracked (e.g., determined) the plain text value of the victim's password. With high-speed custom hardware, such as graphic processing units (GPUs), and easy-to-rent hardware, the cost to an attacker is relatively small to successfully crack passwords, especially when inadequate precautions are taken.

Strong passwords stored with modern hashing algorithms and using effective hashing practices may deter attackers from cracking passwords. Application owner(s) may be responsible for selecting appropriate hashing algorithms. National Institute of Standards and Technology (NIST) and Open Web Application Security Project (OWASP) recommend using 1,300,000 iterations for PBKDF2-HMAC-SHA1, 600,000 iterations for PBKDF2-HMAC-SHA256, and 210,000 iterations for PBKDF2-HMAC-SHA512.

The techniques described herein generally provide for hashing any type of password (even weak passwords) using a hashing algorithm (such as SHA-512), encrypting the resulting hash value with a secret key, and storing the encrypted hash value in the data center 120. Encryption of the hash value may be performed by a CPU of an application server 125 (also referred to herein as a server host), such that the secret key is not present in the memory of the application server 125. The techniques described herein are fast, secure, and unbreakable provided all encryption and key wrapping algorithms and keys are secure.

In accordance with aspects of the present disclosure, an application server 125 (also referred to herein as a server host) may receive a login request that includes a clear text password for an account associated with a tenant of the multi-tenant cloud platform 115. The application server 125 may retrieve (from the data center 120) a payload stored in association with the account. The payload may include a hash value of a user configured password for the account, an indication of a hashing algorithm used for generation of the hash value, an initialization vector, and a key agreement public key associated with the account. Part of the payload may be encrypted using a secret key derived from the key agreement public key associated with the account and a private key 225 provisioned to a key protection component of the application server 125. The application server 125 may transmit (to the key protection component) an API request that includes the payload retrieved from the data center 120 and the clear text password extracted from the login request. The key protection component may use the information provided by the application server 125 to determine whether the clear text password from the login request matches the user configured password.

As shown in the example of FIG. 1, each of the application servers 125 associated with the multi-tenant cloud platform 115 may be provisioned with the same private key 225 for a given service. The private key 225 may be backed by its own certificate issued by a CA of the multi-tenant cloud platform 115, as opposed to relying on other vendors (although other CAs may be used within the scope of the present disclosure). Security personnel associated with the multi-tenant cloud platform 115 can setup the private key 225, and application personnel can handle certificate provisioning, thereby promoting access control and duty separation.

The password encryption techniques described herein may use hardware backed by an encryption standard or key agreement protocol, and may provide one or more of the following advantages: better protection of password hashes using key agreement protocols (such as ECDH), constant time-to-password hashing, limited human access to hash passwords in the clear, commodity hardware-based password protection, and improved protection of passwords for home users, among other examples. Also, if an attacker steals encrypted passwords, they are unbreakable outside the service provider production infrastructure. Further, the described techniques may enable system administrators to change the current encryption scheme to a better (i.e., more secure) alternative without requiring user credentials, thereby promoting greater cryptographic agility.

It should be appreciated by a person skilled in the art that one or more aspects of the disclosure may be implemented in a computing system 100 to solve problems other than those described above. Furthermore, aspects of the disclosure may provide technical improvements to "conventional" systems or processes as described herein. However, the description and appended drawings only include example technical improvements resulting from implementing aspects of the disclosure, and, accordingly, do not represent all of the technical improvements provided within the scope of the claims.

Figure 2A:
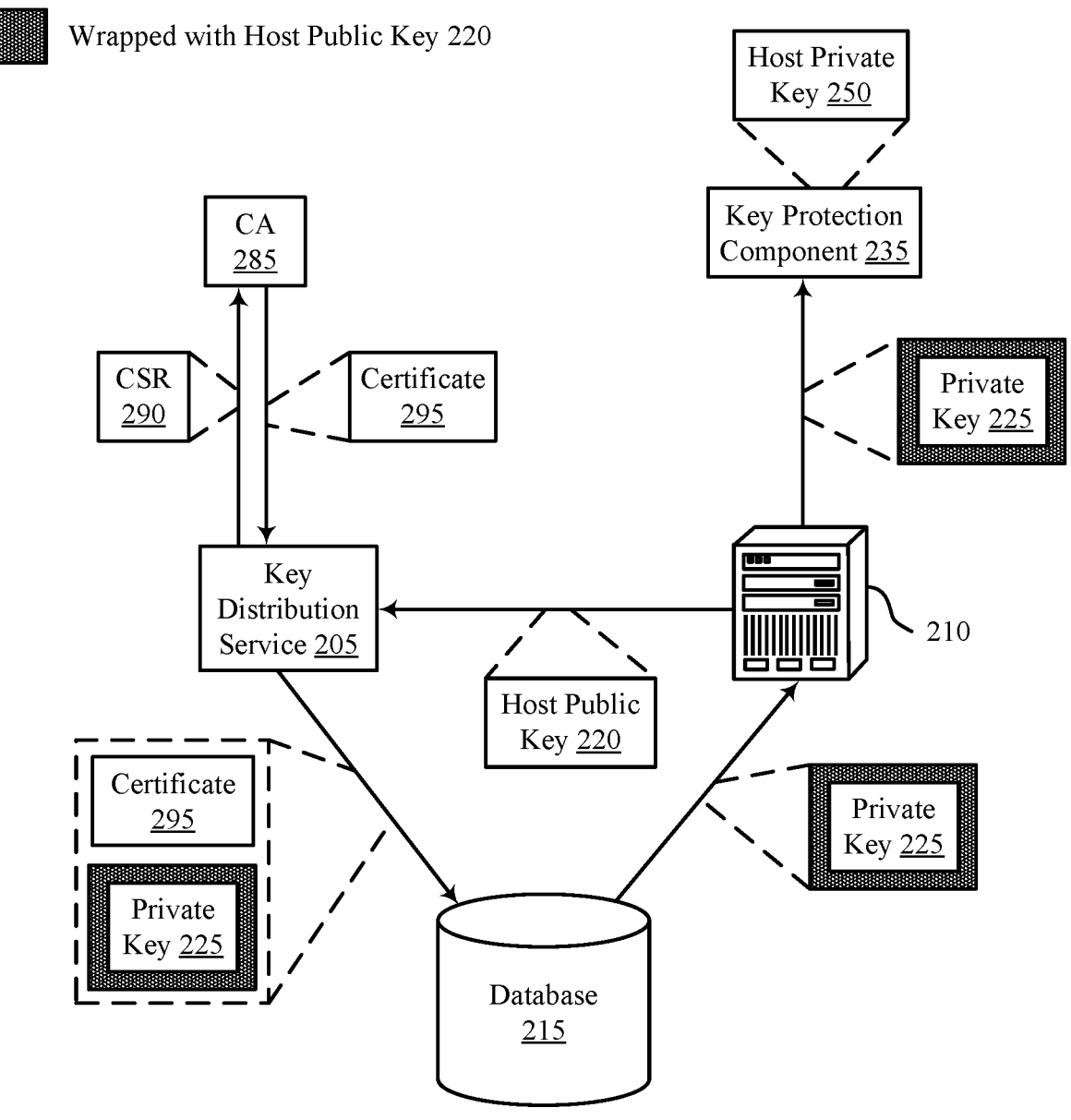
Figure 2B:
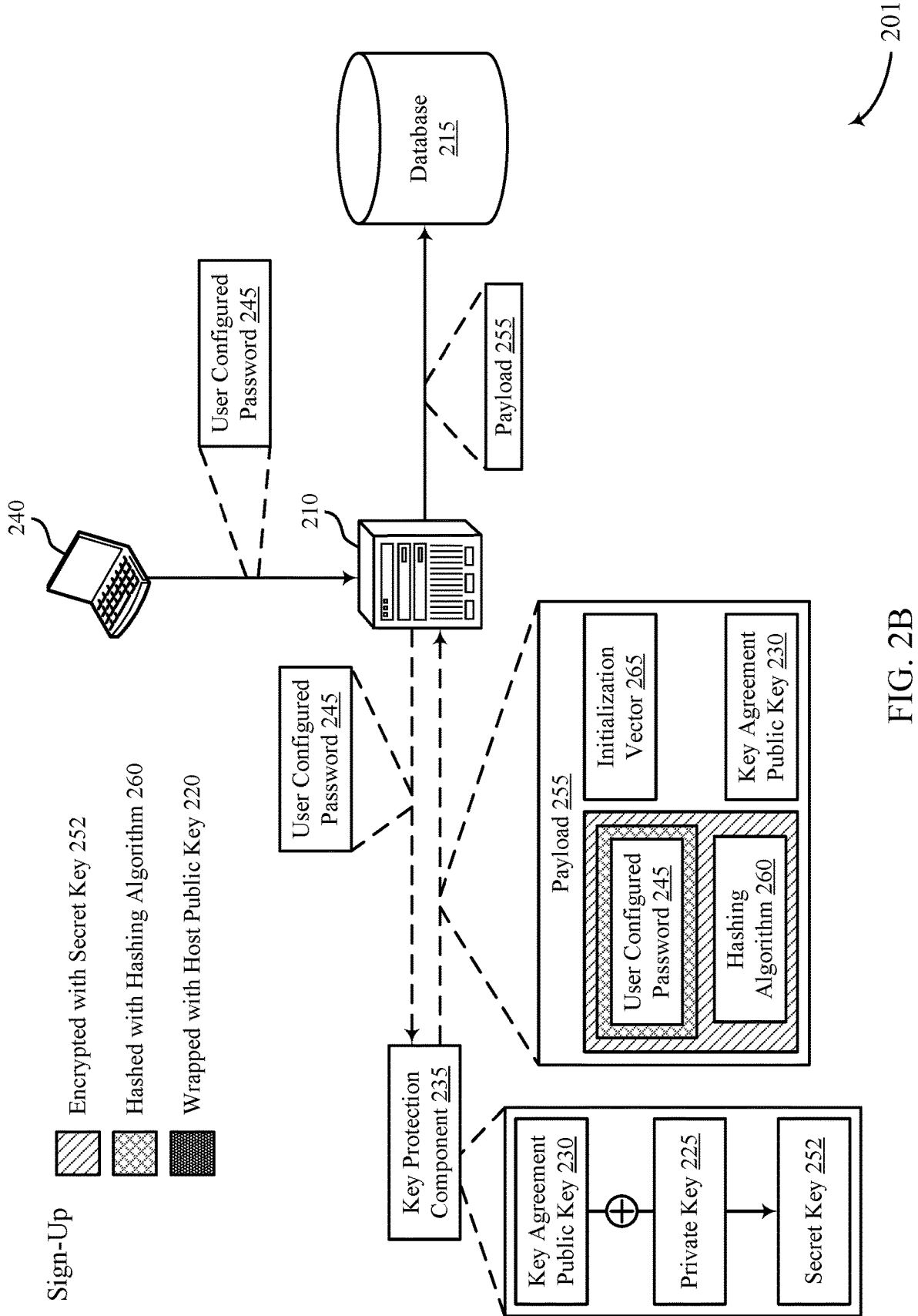

FIGS. 2A, 2B, and 2C show examples of a computing system 200, a computing system 201, and a computing system 202, respectively, that support hardware-backed password security for cloud systems in accordance with aspects of the present disclosure. The computing systems 200 through 202 may implement or be implemented by aspects of the computing system 100. For example, the computing system 200 includes a server host 210, which may be an example of aspects of the application server 125 described with reference to FIG. 1. Likewise, the computing system 201 includes a database 215, which may be an example of aspects of the data center 120, as shown and described with reference to FIG. 1.

The computing system 200 of FIG. 2A illustrates a key provisioning process, whereby a key distribution service 205 provisions a private key 225 to a key protection component 235 of the server host 210. As described herein, the key distribution service 205 may be implemented as an HSM, a master host, or a quorum-based sharing service that uses a distributed key sharing scheme (such as a Shamir Secret Sharing scheme). The key distribution service 205 may enable the same key (such as the private key 225) to be shared across different virtual and/or physical machines within the computing system 200. In some examples, the key distribution service 205 may be supported or otherwise provided by dedicated 1P hardware. For example, a first physical/virtual machine of a 1P data center (such as the data center 120 described with reference to FIG. 1) may be responsible for wrapping the private key 225 with host public keys of other physical/virtual machines within the computing system 200.

In other examples, two or more entities (such as machines or humans) supporting the key distribution service 205 may jointly create the private key 225 in accordance with a quorum-based key sharing scheme, such as a Shamir secret sharing scheme or a multi-party computation (MPC)-based scheme. In a Shamir secret sharing scheme, the private key

225 may be recreated using an M out of N scheme. That is, the entities supporting the key distribution service 205 may be unable to create (i.e., generate) the private key 225 unless a threshold number (M) of the entities (N) are present for the creation of the private key 225, as the key material (e.g., the information necessary to create the private key 225) may be distributed across the entities in such a way that any one entity is unable to create or otherwise access the private key 225. Once created, the private key 225 can be loaded into entity 1, entity 2 can obtain the private key 225 from entity 1, etc. An MPC-based scheme requires multiple parties to be involved in computing a cryptographic function. Other methods of creating/obtaining the private key 225 are not precluded.

To initiate the key provisioning process, the server host 210 may pass a host public key 220 (such as a Rivest-Shamir-Adleman (RSA) public key of the server host 210) to the key distribution service 205. In turn, the key distribution service 205 may use one or more of the key provisioning mechanisms discussed above to obtain (i.e., generate, acquire, derive) the private key 225. Thereafter, the key distribution service 205 may generate a CSR 290 using the private key 225 and send the CSR 290 to a CA 285 associated with (i.e., hosted or otherwise supported by) the multi-tenant cloud platform 115. In response to the CSR 290, the CA 285 may issue a digital certificate 295 for a public key associated with the private key 225. Upon receiving the digital certificate 295 from the CA 285, the key distribution service 205 may wrap the private key 225 with the host public key 220 (provided by the server host 210) and store both the wrapped private key 225 and the digital certificate 295 in the database 215 or a file system. In some implementations, the key distribution service 205 may provide a copy of the wrapped private key 225 to the server host 210.

The server host 210 may retrieve the wrapped private key 225 from the database 215 (or obtain it directly from the key distribution service 205) and pass the wrapped private key 225 to the key protection component 235. Accordingly, the key protection component 235 may use a host private key 250 (such as an RSA private key of the server host 210) to unwrap the private key 225. In some implementations, the key protection component 235 may preserve or otherwise retain the private key 225 in a cache or other local storage location, thereby enabling the key protection component 235 to use the private key 225 for subsequent operations. In the event that the key protection component 235 is shut down or rebooted, the server host 210 may resend the wrapped private key 225 to the key protection component 235 (e.g., as a part of application start-up).

In some implementations, the key distribution service 205 may verify the identity of the server host 210 and/or the authenticity of the host public key 220 before returning the wrapped private key 225 to the server host 210. In third-party (3P) deployments, the server host 210 may call (i.e., invoke) the key distribution service 205 each time the wrapped private key 225 is needed (e.g., each time the server host 210 (re)starts an application that uses the private key 225). In first-party (1P) deployments, the wrapped private key 225 may be stored in the database 215, along with other instances of the private key 225 wrapped with public keys of other server hosts in a sub-system (i.e., pod) of the computing system 200. In other words, the database 215 may include a first instance of the private key 225 wrapped with the host public key 220, a second instance of the private key 225 wrapped with the public key of another server host, etc. Storing wrapped private keys 225 in the database 215 may reduce the number of API calls made to the key distribution service 205, thereby resulting in lower signaling overhead and reduced latency.

The computing system of FIG. 2B illustrates a sign-up process, whereby a key protection component 235 of the server host 210 hashes and encrypts a user configured password 245 set by a user of a client device 240. To begin the sign-up process, the server host 210 may prompt the user to enter a password (e.g., via a user interface of the client device 240). Once the user enters the user configured password 245 (i.e., a plain text password), the server host 210 may provide the user configured password 245 to the key protection component 235 (for example, via an API call).

In some implementations, the key protection component 235 may support Intel® Quick Assist Technology (QAT), which includes Intel® Key Protection Technology (KPT), and these technologies may help accelerate data encryption and compression at the server host 210. For example, the key protection component 235 may provide hardware accelera- tion and CPU offloading capabilities for enhanced compres- sion and decompression. The key protection component 235 may be implemented in hardware, software executed by at least one processor, firmware, or any combination thereof. Although the key protection component 235 is depicted as being separate from the server host 210, it is to be under- stood that the key protection component 235 may be physi- cally integrated or co-located with other components of the server host 210. The key protection component 235 may have exclusive access to the host private key 250 (for example, an RSA private key of the server host 210), such that the host private key 250 is not stored or otherwise accessible in the memory of the server host 210.

Upon receiving the API call from the server host 210, the key protection component 235 may select a hashing algo- rithm 260 (such as SHA-256, SHA-384, or SHA-512) and use the selected hashing algorithm to generate a hash value of the user configured password 245. Accordingly, the key protection component 235 may derive a secret key 252 using a key agreement public key 230 and the private key 225 provisioned to the key protection component 235. In some implementations, the key protection component 235 may derive the secret key 252 according to an ECDH key agreement protocol (in which two parties establish a shared secret using an elliptic-curve public/private key pair). For example, the key protection component 235 may generate a key agreement public key pair that includes the key agree- ment public key 230 and a corresponding key agreement private key. The key protection component 235 may discard the key agreement private key and use the key agreement public key 230 to derive the secret key 252.

The key protection component 235 may use the secret key 252 and an initialization vector 265 to encrypt the hash value of the user configured password 245 and an indication of the hashing algorithm 260. Once encryption is complete, the key protection component 235 may generate a payload 255 that includes the encrypted hash value of the user configured password, the encrypted indication of the hashing algorithm 260, the initialization vector 265, and the key agreement public key 230. Without knowing the initialization vector 265 (such as a nonce) that was used to encrypt the payload 255, the key protection component 235 may be unable to decrypt the payload 255 later on. Similarly, the key protec- tion component 235 may be unable to re-create the secret key 252 without knowing the key agreement public key 230. In turn, the key protection component 235 may provide the payload 255 to the server host 210. Upon receiving the payload 255, the server host 210 may store the payload 255 in the database 215. The payload 255 may be stored in association with the particular account for which the user configured password 245 was created.

The computing system 202 of FIG. 2C illustrates an example of a password verification/authentication process, whereby the key protection component 235 compares a clear text password 275 (for example, a login attempt) to the user configured password 245 created during the provisioning process shown and described with reference to FIG. 2B. The password verification process may begin with the server host 210 receiving a login request from a user. The login request may include a clear text password 275 for an account associated with a tenant of the multi-tenant cloud platform 115. Provided the account is valid (i.e., exists), the server host 210 may retrieve the payload 255 stored in association with the account. As described herein, the payload 255 retrieved from the database 215 may include a hash value of the user configured password 245 for the account, an indi- cation of a hashing algorithm 260 used to generate the hash value, an initialization vector 265 used for encryption of the payload 255, and a key agreement public key 230 associated with the account. A first portion of the payload 255 (i.e., the hash value of the user configured password 245 and the indication of the hashing algorithm 260) may be encrypted with the secret key 252, while a second portion of the payload 255 (i.e., the initialization vector 265 and the key agreement public key) may be unencrypted.

After retrieving the payload 255 from the database 215, the server host 210 may send the payload 255 to the key protection component 235 via an API call. As described with reference to FIG. 2B, the key protection component 235 may be physically integrated or co-located with other compo- nents of the server host 210, and may have exclusive access to the host private key 250. Upon receiving the payload 255 (which includes the clear text password 275, the key agree- ment public key 230, the encrypted hash value of the user configured password 245, and the encrypted indication of the hashing algorithm 260), the key protection component 235 may use the key agreement public key 230 and the private key 225 (provisioned to the key protection compo- nent 235 at start-up) to generate the secret key 252. The server host 210 does not need to include the private key 225 in subsequent API calls to the key protection component 235 if the key protection component 235 already has access to the private key 225.

Provided the key agreement public key 230 and the private key 225 are the same as those used to derive the secret key 252 during the sign-up phase (as shown and described with reference to FIG. 2B), the secret key 252 generated by the key protection component 235 will be the same as the original secret key 252. Accordingly, the key protection component 235 may use the secret key 252 and the initialization vector 265 to decrypt the rest of the payload 255. The key protection component 235 may use the hashing algorithm 260 indicated by the payload 255 to generate a hash value of the clear text password 275 from the login request, and may compare the result to the hash value of the user configured password 245 for the account.

If the two hash values do not match (indicating the clear text password 275 is different from the user configured password 245), the key protection component 235 may return a Boolean 280 with a first value (False). If the two hash values match (indicating the clear text password 275 is the same as the user configured password 245), the key protection component 235 may return a Boolean 280 with a second value (True). If the Boolean 280 indicates the second value, the server host 210 may approve the login request from the user. If the Boolean indicates the first value, the server host 210 may deny the login request or prompt the user to re-enter the password.

Figure 3A:
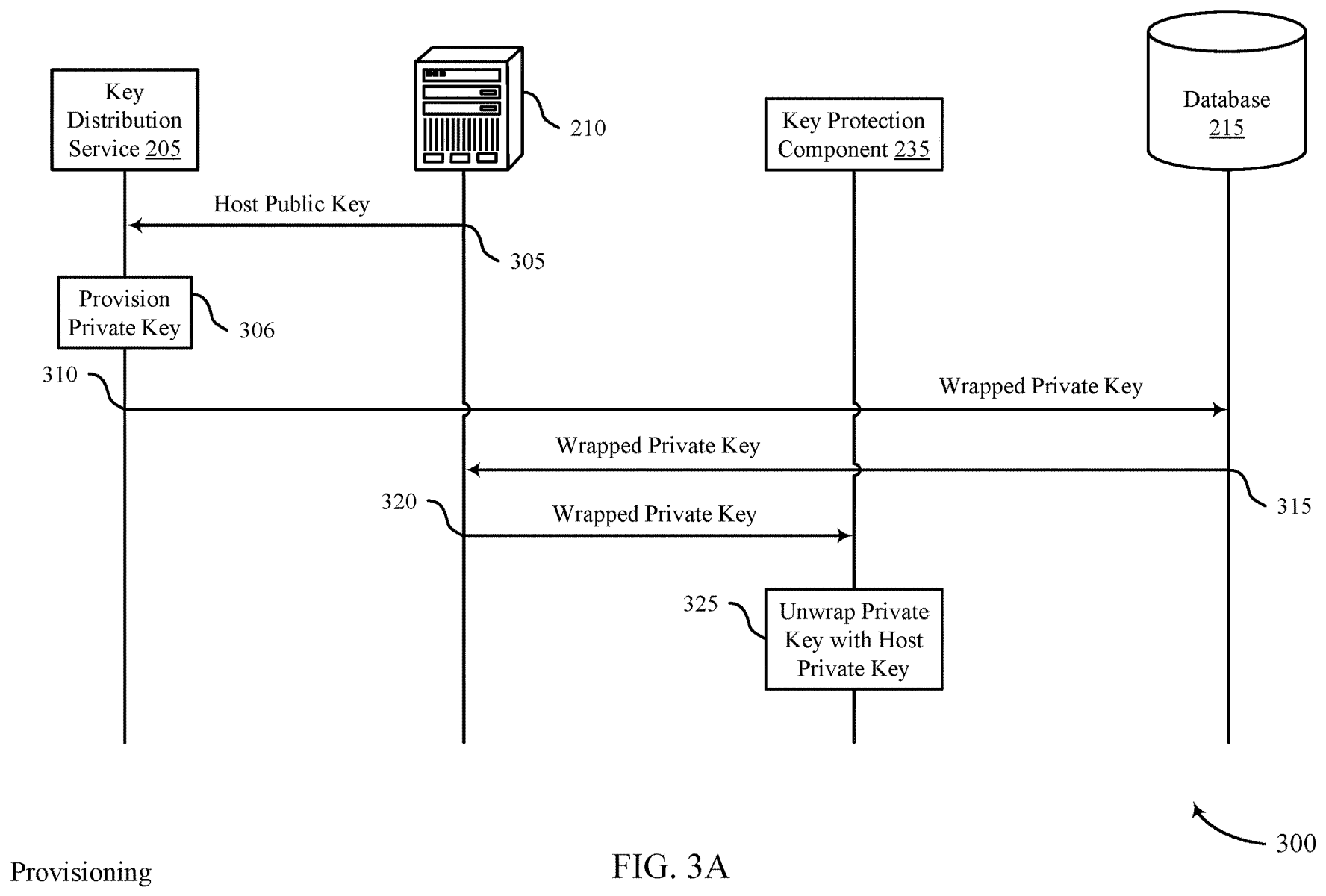
Figure 3B:
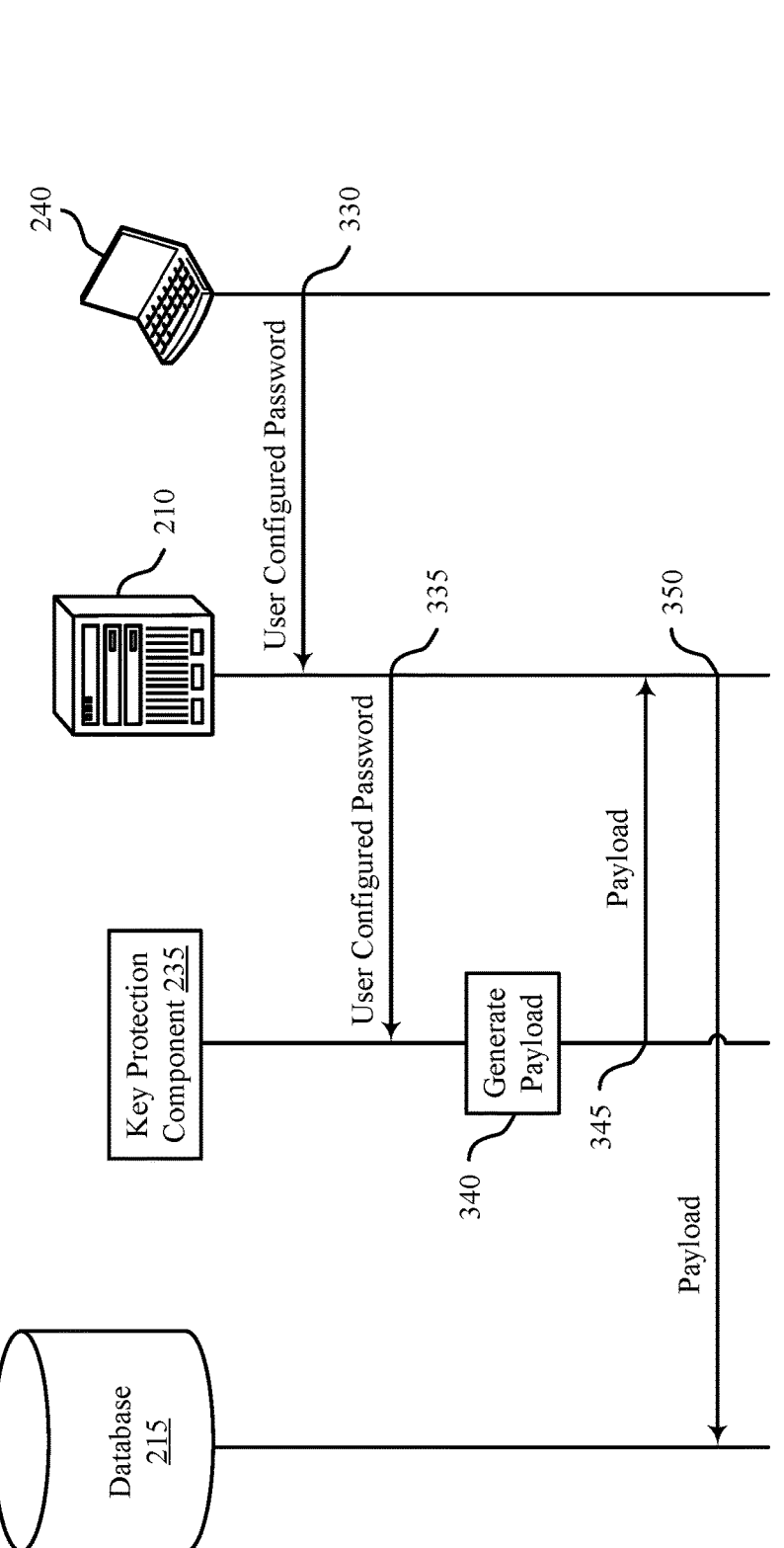
Figure 3C:
Figure 3C:
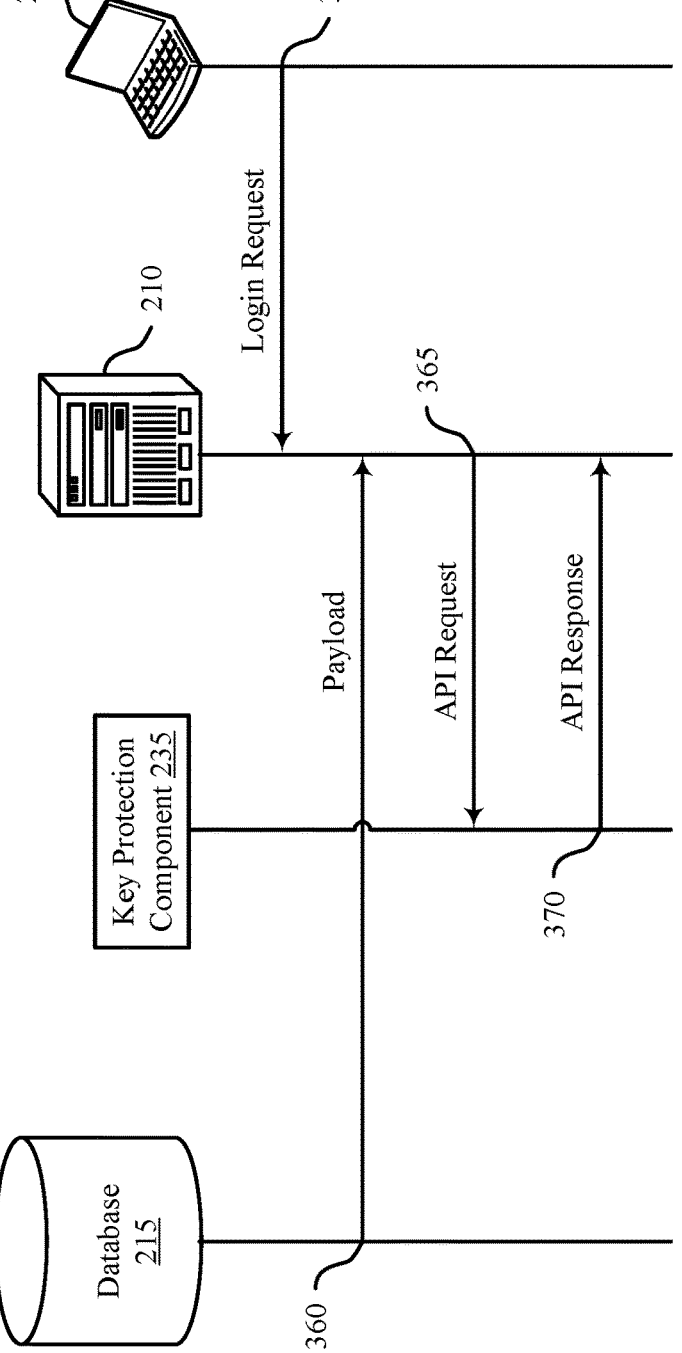

FIGS. 3A, 3B, and 3C show examples of a process flow 300, a process flow 301, and a process flow 302, respectively, that support hardware-backed password security for cloud systems in accordance with aspects of the present disclosure. The process flows 300 through 302 may implement or be implemented by aspects of any of the computing systems 100 through 202. For example, the process flow 300 includes a server host 210 and a database 215, which may be examples of corresponding elements described herein, including with reference to FIGS. 2A through 2C. In the following description of the process flows 300 through 302, operations may be added, omitted, or performed in a different order (with respect to the exemplary order shown).

The process flow 300 of FIG. 3A illustrates a key provisioning process, whereby a key distribution service 205 provisions a private key 225 to a key protection component 235 of the server host 210. As described herein, the key distribution service 205 may be implemented as an HSM, a master host, or a quorum-based sharing service that uses a distributed key sharing scheme (such as a Shamir Secret Sharing scheme). The key distribution service 205 may enable the same key (such as the private key 225) to be shared across different virtual and/or physical machines. In some examples, the key distribution service 205 may be supported or otherwise provided by dedicated 1P hardware. For example, a first physical/virtual machine of a 1P data center (such as the data center 120 described with reference to FIG. 1) may be responsible for wrapping the private key 225 with host public keys of other physical/virtual machines (such as the application servers 125 shown and described with reference to FIG. 1).

In other examples, two or more entities (such as machines or humans) supporting the key distribution service 205 may jointly create the private key 225 in accordance with a quorum-based key sharing scheme, such as a Shamir secret sharing scheme or a multi-party computation (MPC)-based scheme. In a Shamir secret sharing scheme, the private key 225 may be recreated using an M out of N scheme. That is, the entities supporting the key distribution service 205 may be unable to create (i.e., generate) the private key 225 unless a threshold number (M) of the entities (N) are present for the creation of the private key 225, as the key material (e.g., the information necessary to create the private key 225) may be distributed across the entities in such a way that any one entity is unable to create or otherwise access the private key 225. Once created, the private key 225 can be loaded into entity 1, entity 2 can obtain the private key 225 from entity 1, etc. An MPC-based scheme requires multiple parties to be involved in computing a cryptographic function. Other methods of creating/obtaining the private key 225 are not precluded.

At 305, the server host 210 may pass a host public key 220 (such as a Rivest-Shamir-Adleman (RSA) public key of the server host 210) to the key distribution service 205. At 306, the key distribution service 205 may use one or more of the key provisioning mechanisms discussed above to obtain (i.e., generate, acquire, derive) the private key 225. Thereafter, the key distribution service 205 may generate a CSR 290 using the private key 225 and send the CSR 290 to a CA 285 associated with (i.e., hosted or otherwise supported by) the multi-tenant cloud platform 115. In response to the CSR 290, the CA 285 may issue a digital certificate 295 for a public key associated with the private key 225. At 310, the key distribution service 205 may wrap the private key 225 with the host public key 220 (provided by the server host 210) and store both the wrapped private key 225 and the digital certificate 295 in the database 215 or a file system. In some implementations, the key distribution service 205 may provide a copy of the wrapped private key 225 to the server host 210.

At 315, the server host 210 may retrieve the wrapped private key 225 from the database 215 (or obtain it directly from the key distribution service 205) and pass the wrapped private key 225 to the key protection component 235 at 320. At 325, the key protection component 235 may use a host private key 250 (such as an RSA private key of the server host 210) to unwrap the private key 225. In some implementations, the key protection component 235 may preserve or otherwise retain the private key 225 in a cache or other local storage location, thereby enabling the key protection component 235 to use the private key 225 for subsequent operations. In the event that the key protection component 235 is shut down or rebooted, the server host 210 may resend the wrapped private key 225 to the key protection component 235 (e.g., as a part of application start-up).

In some implementations, the key distribution service 205 may verify the identity of the server host 210 and/or the authenticity of the host public key 220 before returning the wrapped private key 225 to the server host 210. In third-party (3P) deployments, the server host 210 may call (i.e., invoke) the key distribution service 205 each time the wrapped private key 225 is needed (e.g., each time the server host 210 (re)starts an application that uses the private key 225). In first-party (1P) deployments, the wrapped private key 225 may be stored in the database 215, along with other instances of the private key 225 wrapped with public keys of other server hosts in a sub-system (i.e., pod) of the computing system 200. In other words, the database 215 may include a first instance of the private key 225 wrapped with the host public key 220, a second instance of the private key 225 wrapped with the public key of another server host, etc. Storing wrapped private keys 225 in the database 215 may reduce the number of API calls made to the key distribution service 205, thereby resulting in lower signaling overhead and reduced latency.

The process flow 301 of FIG. 3B illustrates a sign-up process, whereby a key protection component 235 of the server host 210 hashes and encrypts a user configured password 245 set by a user of a client device 240. To begin the sign-up process, the server host 210 may prompt the user to enter a password (e.g., via a user interface of the client device 240). Once the user enters the user configured password 245 (i.e., a plain text password) at 330, the server host 210 may provide the user configured password 245 to the key protection component 235 at 335 (for example, via an API call).

In some implementations, the key protection component 235 may support Intel® Quick Assist Technology (QAT), which can help accelerate data encryption and compression at the server host 210. For example, the key protection component 235 may provide hardware acceleration and CPU offloading capabilities for enhanced compression and decompression. The key protection component 235 may be implemented in hardware, software executed by at least one processor, firmware, or any combination thereof. Although the key protection component 235 is depicted as being separate from the server host 210, it is to be understood that the key protection component 235 may be physically integrated or co-located with other components of the server host 210. The key protection component 235 may have exclusive access to the host private key 250 (for example, an RSA private key of the server host 210), such that the host private key 250 is not stored or otherwise accessible in the memory of the server host 210.

Upon receiving the API call from the server host 210, the key protection component 235 may select a hashing algorithm 260 (such as SHA-256, SHA-384, or SHA-512) and use the selected hashing algorithm to generate a hash value of the user configured password 245. Accordingly, the key protection component 235 may derive a secret key 252 using a key agreement public key 230 and the private key 225 provisioned to the key protection component 235. In some implementations, the key protection component 235 may derive the secret key 252 according to an ECDH key agreement protocol (in which two parties establish a shared secret using an elliptic-curve public/private key pair). For example, the key protection component 235 may generate a key agreement public key pair that includes the key agreement public key 230 and a corresponding key agreement private key. The key protection component 235 may discard the key agreement private key and use the key agreement public key 230 to derive the secret key 252.

The key protection component 235 may use the secret key 252 and an initialization vector 265 to encrypt the hash value of the user configured password 245 and an indication of the hashing algorithm 260. At 340, the key protection component 235 may generate a payload 255 that includes the encrypted hash value of the user configured password, the encrypted indication of the hashing algorithm 260, the initialization vector 265, and the key agreement public key 230. Without knowing the initialization vector 265 (such as a nonce) that was used to encrypt the payload 255, the key protection component 235 may be unable to decrypt the payload 255 later on. Similarly, the key protection component 235 may be unable to re-create the secret key 252 without knowing the key agreement public key 230. At 345, the key protection component 235 may provide the payload 255 to the server host 210. At 350, the server host 210 may store the payload 255 in the database 215. The payload 255 may be stored in association with the particular account for which the user configured password 245 was created.

The process flow 302 of FIG. 3C illustrates an example of a password verification/authentication process, whereby the key protection component 235 compares a clear text password 275 (for example, a login attempt) to the user configured password 245 created during the provisioning process shown and described with reference to FIG. 3B. The password verification process may begin with the server host 210 receiving a login request from a user at 355. The login request may include a clear text password 275 for an account associated with a tenant of the multi-tenant cloud platform 115. At 360, the server host 210 may retrieve the payload 255 stored in association with the account, provided the account is valid (i.e., exists). As described herein, the payload 255 retrieved from the database 215 may include a hash value of the user configured password 245 for the account, an indication of a hashing algorithm 260 used to generate the hash value, an initialization vector 265 used for encryption of the payload 255, and a key agreement public key 230 associated with the account. A first portion of the payload 255 (i.e., the hash value of the user configured password 245 and the indication of the hashing algorithm 260) may be encrypted with the secret key 252, while a second portion of the payload 255 (i.e., the initialization vector 265 and the key agreement public key) may be unencrypted.

At 365, the server host 210 may send the payload 255 to the key protection component 235 via an API call. As described with reference to FIG. 3B, the key protection component 235 may be physically integrated or co-located with other components of the server host 210, and may have exclusive access to the host private key 250. Upon receiving the payload 255 (which includes the clear text password 275, the key agreement public key 230, the encrypted hash value of the user configured password 245, and the encrypted indication of the hashing algorithm 260), the key protection component 235 may use the key agreement public key 230 and the private key 225 (provisioned to the key protection component 235 at start-up) to generate the secret key 252. The server host 210 does not need to include the private key 225 in subsequent API calls to the key protection component 235 if the key protection component 235 already has access to the private key 225.

Provided the key agreement public key 230 and the private key 225 are the same as those used to derive the secret key 252 during the sign-up phase (as shown and described with reference to FIG. 2B), the secret key 252 generated by the key protection component 235 will be the same as the original secret key 252. Accordingly, the key protection component 235 may use the secret key 252 and the initialization vector 265 to decrypt the rest of the payload 255. The key protection component 235 may use the hashing algorithm 260 indicated by the payload 255 to generate a hash value of the clear text password 275 from the login request, and may compare the hash value of the clear text password 275 to the hash value of the user configured password 245 for the account.

If the two hash values do not match (indicating the clear text password 275 is different from the user configured password 245), the key protection component 235 may return a Boolean 280 with a first value (False). If the two hash values match (indicating the clear text password 275 is the same as the user configured password 245), the key protection component 235 may return a Boolean 280 with a second value (True). The key protection component 235 may return the Boolean 280 to the server host 210 at 370 (e.g., via an API response). If the Boolean 280 indicates the second value, the server host 210 may approve the login request from the user. If the Boolean indicates the first value, the server host 210 may deny the login request or prompt the user to re-enter the password.

Figure 4:
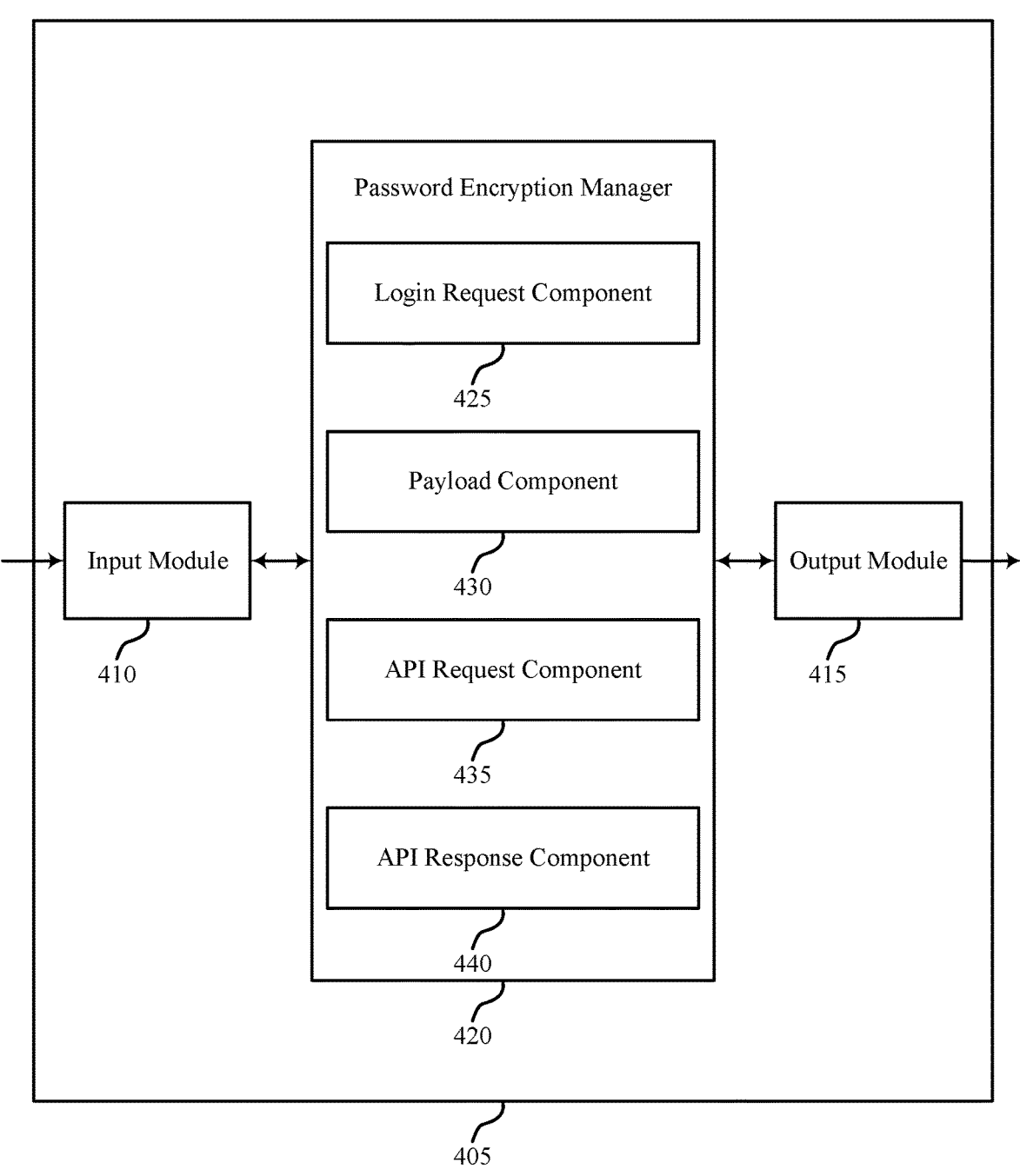
FIG. 4 shows a block diagram of an apparatus that supports hardware-backed password security for cloud systems in accordance with aspects of the present disclosure.

FIG. 4 shows a block diagram 400 of a device 405 that supports hardware-backed password security for cloud systems in accordance with aspects of the present disclosure. The device 405 may include an input module 410, an output module 415, and a password encryption manager 420. The device 405, or one of more components of the device 405 (e.g., the input module 410, the output module 415, and the password encryption manager 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the password encryption manager 420 to support hardware-backed password security for cloud systems. In some cases, the input module 410 may be a component of an input/output (I/O) controller 610, as described with reference to FIG. 6.

The output module 415 may manage output signals for the device 405. For example, the output module 415 may receive signals from other components of the device 405, such as the password encryption manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610, as described with reference to FIG. 6.

For example, the password encryption manager 420 may include a login request component 425, a payload component 430, an API request component 435, an API response component 440, or any combination thereof. In some examples, the password encryption manager 420, or various components thereof, may be configured to perform various operations (e.g., receiving, monitoring, transmitting) using or otherwise in cooperation with the input module 410, the output module 415, or both. For example, the password encryption manager 420 may receive information from the input module 410, send information to the output module 415, or be integrated in combination with the input module 410, the output module 415, or both to receive information, transmit information, or perform various other operations as described herein.

The password encryption manager 420 may support data processing in accordance with examples disclosed herein. The login request component 425 may be configured to or capable of receiving, at a server host, a login request that includes a clear text password for an account associated with a tenant of a multi-tenant cloud platform. The payload component 430 may be configured to or capable of retrieving, from a database associated with the multi-tenant cloud platform, a payload stored in association with the account, the payload including a hash value of a user configured password for the account and an indication of a hashing algorithm used for generation of the hash value, where at least a portion of the payload is encrypted using a secret key derived from a key agreement public key associated with the account and a private key provisioned to a key protection component of the server host. The API request component 435 may be configured to or capable of transmitting, to the key protection component, an API request including the encrypted payload retrieved from the database, the clear text password extracted from the login request, and the key agreement public key associated with the account. The API response component 440 may be configured to or capable of receiving an API response that indicates whether a hash value of the clear text password from the login request corresponds to the hash value of the user configured password for the account.

Figure 5:
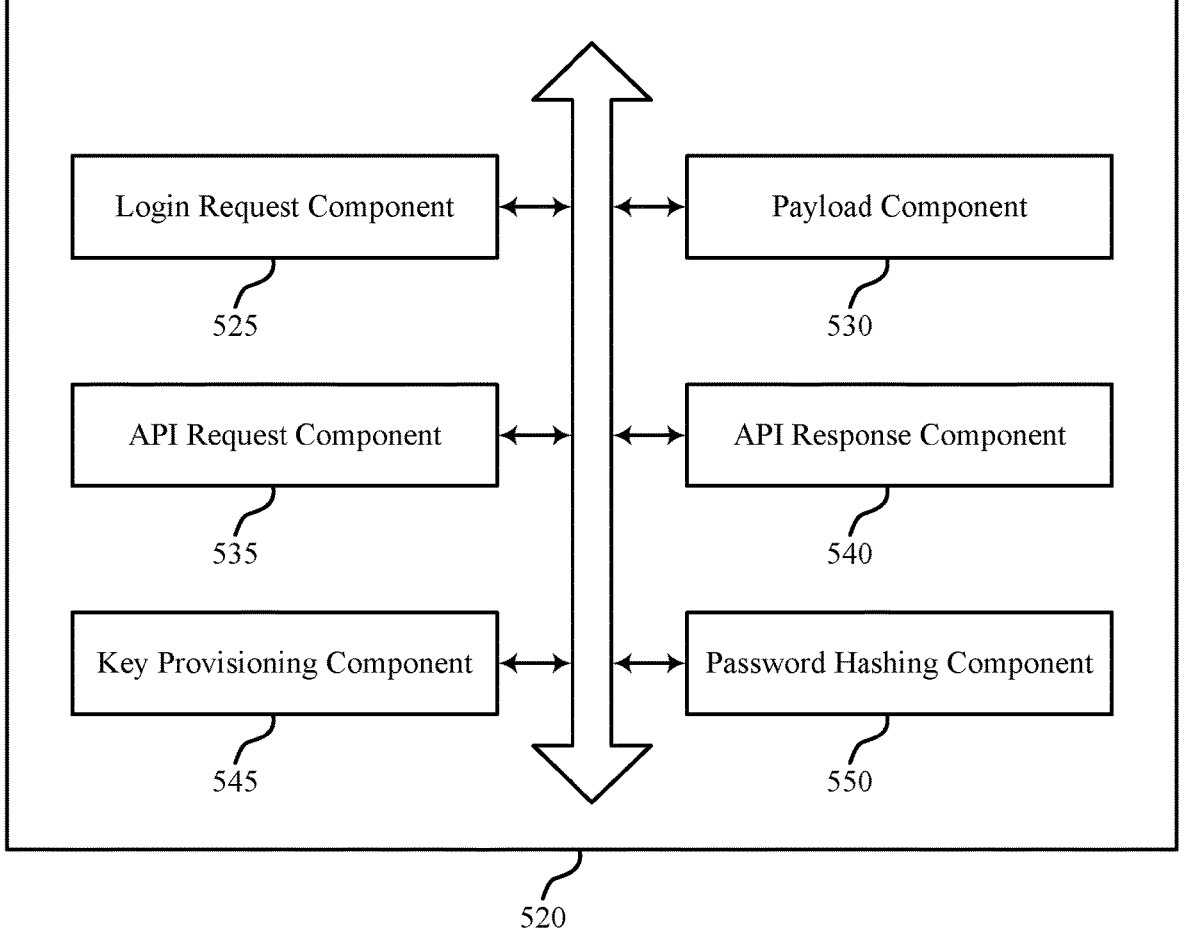
FIG. 5 shows a block diagram of a password encryption manager that supports hardware-backed password security for cloud systems in accordance with aspects of the present disclosure.

FIG. 5 shows a block diagram 500 of a password encryption manager 520 that supports hardware-backed password security for cloud systems in accordance with aspects of the present disclosure. The password encryption manager 520 may be an example of aspects of a password encryption manager or a password encryption manager 420, or both, as described herein. The password encryption manager 520, or various components thereof, may be an example of means for performing various aspects of hardware-backed password security for cloud systems as described herein. For example, the password encryption manager 520 may include a login request component 525, a payload component 530, an API request component 535, an API response component 540, a key provisioning component 545, a password hashing component 550, or any combination thereof. Each of these components, or components of subcomponents thereof (e.g., one or more processors, one or more memories), may communicate, directly or indirectly, with one another (e.g., via one or more buses).

The password encryption manager 520 may support data processing in accordance with examples disclosed herein. The login request component 525 may be configured to or capable of receiving, at a server host, a login request that includes a clear text password for an account associated with a tenant of a multi-tenant cloud platform. The payload component 530 may be configured to or capable of retrieving, from a database associated with the multi-tenant cloud platform, a payload stored in association with the account, the payload including a hash value of a user configured password for the account and an indication of a hashing algorithm used for generation of the hash value, where at least a portion of the payload is encrypted using a secret key derived from a key agreement public key associated with the account and a private key provisioned to a key protection component of the server host. The API request component 535 may be configured to or capable of transmitting, to the key protection component, an API request including the encrypted payload retrieved from the database, the clear text password extracted from the login request, and the key agreement public key associated with the account. The API response component 540 may be configured to or capable of receiving an API response that indicates whether a hash value of the clear text password from the login request corresponds to the hash value of the user configured password for the account.

In some examples, the key provisioning component 545 may be configured to or capable of transmitting, to the key protection component, a first message including the user configured password and the key agreement public key associated with the account. In some examples, the payload component 530 may be configured to or capable of receiving, from the key protection component, a second message including the encrypted payload and an initialization vector associated with the encrypted payload.

In some examples, generate the secret key using the key agreement public key in the first message and the private key provisioned to the key protection component. In some examples, generate the hash value of the user configured password using the hashing algorithm. In some examples, include the hash value and the indication of the hashing algorithm in the payload. In some examples, encrypt the payload using the secret key and the initialization vector. In some examples, return the encrypted payload and the initialization vector to the server host.

In some examples, the payload component 530 may be configured to or capable of storing the encrypted payload and the initialization vector in the database. In some examples, the payload component 530 may be configured to or capable of retrieving the encrypted payload and the initialization vector from the database in response to the login request. In some examples, the payload component 530 may be configured to or capable of including the encrypted payload and the initialization vector in the API request.

In some examples, the hashing algorithm used for generation of the hash value is selected by the key protection component. In some examples, the private key is provisioned by a key distribution service that includes at least one of an HSM, or a master host, or a quorum-based key sharing service.

In some examples, generate the secret key using the key agreement public key in the API request and the private key provisioned to the key protection component. In some examples, decrypt the payload using the secret key and an initialization vector associated with the payload. In some examples, generate a hash value of the clear text password from the login request using the hashing algorithm associated with the payload. In some examples, compare the hash value of the clear text password to the hash value of the user configured password for the account.

In some examples, the key provisioning component 545 may be configured to or capable of transmitting, to the key protection component, a message including the private key wrapped by a host public key associated with the server host.

In some examples, unwrap the private key using a host private key associated with the server host, where the host private key is locally accessible to the key protection component.

In some examples, the key provisioning component 545 may be configured to or capable of storing, in the database, the private key wrapped by the host public key associated with the server host.

In some examples, the database includes two or more instances of the private key wrapped by respective host public keys associated with server hosts of a sub-system of the multi-tenant cloud platform that includes the server host.

In some examples, the API response includes a Boolean that indicates whether a hash value of the clear text password from the login request matches the hash value of the user configured password for the account.

In some examples, the private key is associated with a digital certificate provisioned by a CA of the multi-tenant cloud platform. In some examples, the secret key is generated using an ECDH key agreement scheme. In some examples, the hashing algorithm includes SHA-256, SHA-384, SHA-512, or a Keccak algorithm.

Figure 6:
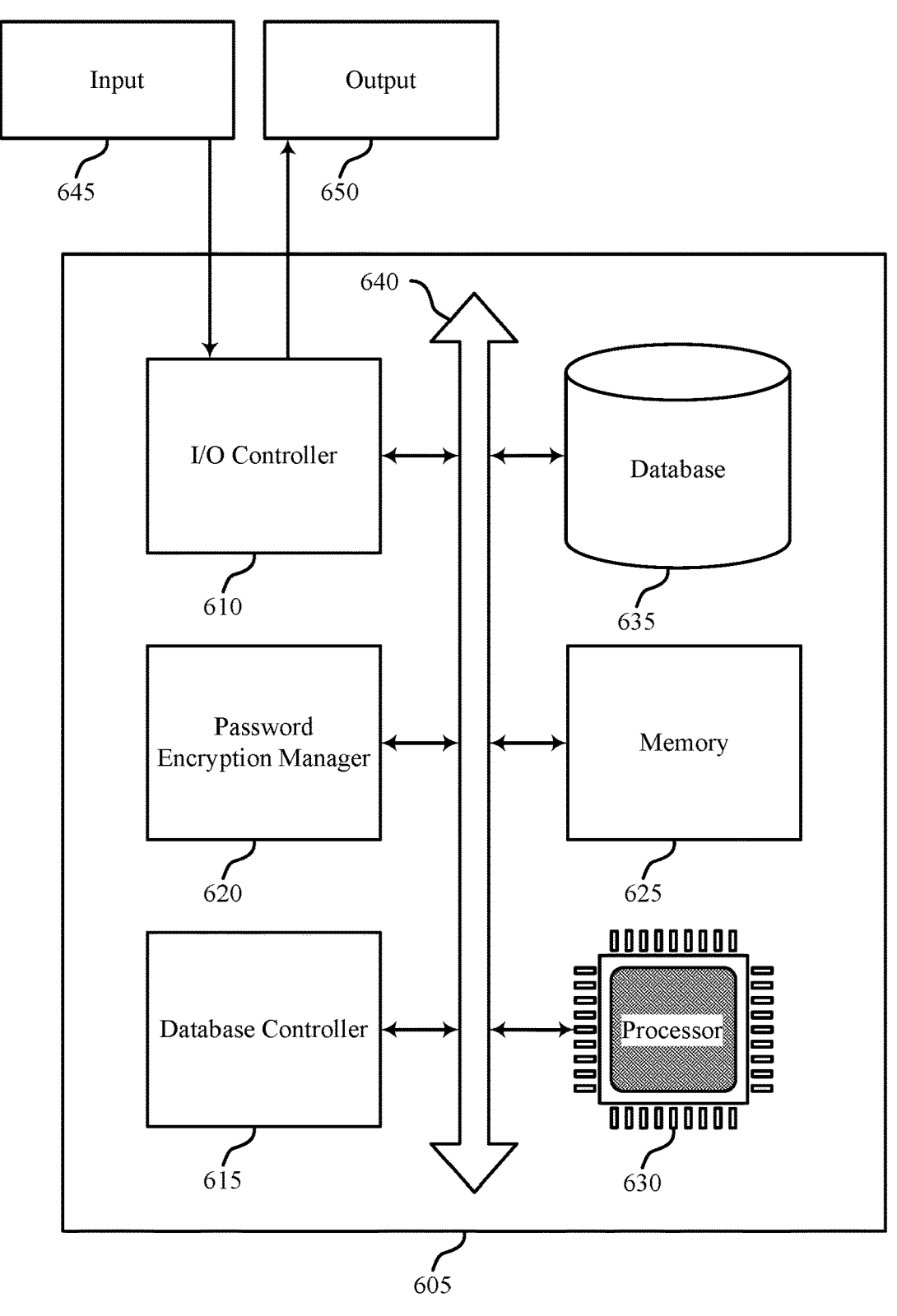
FIG. 6 shows a diagram of a system including a device that supports hardware-backed password security for cloud systems in accordance with aspects of the present disclosure.

FIG. 6 shows a diagram of a system 600 including a device 605 that supports hardware-backed password security for cloud systems in accordance with aspects of the present disclosure. The device 605 may be an example of or include the components of a device 405 as described herein. The device 605 may include components for data communications, including components for transmitting and receiving communications, such as a password encryption manager 620, an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WIN-DOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause at least one processor 630 to perform various functions described herein. In some cases, the memory 625 may contain, among other things, a basic I/O system (BIOS) which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting hardware-backed password security for cloud systems). The processor 630 may be an example of a single processor or multiple processors. For example, the device 605 may include one or more processors 630.

The password encryption manager 620 may support data processing in accordance with examples disclosed herein. For example, the password encryption manager 620 may be configured to or capable of receiving, at a server host, a login request that includes a clear text password for an account associated with a tenant of a multi-tenant cloud platform. The password encryption manager 620 may be configured to or capable of retrieving, from a database associated with the multi-tenant cloud platform, a payload stored in association with the account, the payload including a hash value of a user configured password for the account and an indication of a hashing algorithm used for generation of the hash value, where at least a portion of the payload is encrypted using a secret key derived from a key agreement public key associated with the account and a private key provisioned to a key protection component of the server host. The password encryption manager 620 may be configured to or capable of transmitting, to the key protection component, an API request including the encrypted payload retrieved from the database, the clear text password extracted from the login request, and the key agreement public key associated with the account. The password encryption manager 620 may be configured to or capable of receiving an API response that indicates whether a hash value of the clear text password from the login request corresponds to the hash value of the user configured password for the account.

Configuring the password encryption manager 620 to store and manage passwords in accordance with the hardware-based encryption scheme(s) described herein may reduce the likelihood of sensitive information (such as passwords) being stolen, compromised, intercepted, etc. Accordingly, the described techniques may improve the overall security of the device 605 by ensuring that passwords cannot be cracked (i.e., deciphered) by attackers. The techniques described herein may also promote greater resilience and scalability, as the same private key can be used to securely encrypt a large number of individual passwords.

FIG. 7 shows a flowchart illustrating a method 700 that supports hardware-backed password security for cloud systems in accordance with aspects of the present disclosure. The operations of the method 700 may be implemented by a data processing system or components thereof. For example, the operations of the method 700 may be performed by the server host 210, as described with reference to FIGS. 2A through 3C. In some examples, the data processing system may execute a set of instructions to control the functional elements of the data processing system to perform the described functions. Additionally, or alternatively, the data processing system may perform aspects of the described functions using special-purpose hardware.

At 705, the method may include receiving, at a server host, a login request that includes a clear text password for an account associated with a tenant of a multi-tenant cloud platform. The operations of 705 may be performed in accordance with examples disclosed herein. In some examples, aspects of the operations of 705 may be performed by a login request component 525, as described with reference to FIG. 5.

At 710, the method may include retrieving, from a database associated with the multi-tenant cloud platform, a payload stored in association with the account, the payload including a hash value of a user configured password for the account and an indication of a hashing algorithm used for generation of the hash value, where at least a portion of the payload is encrypted using a secret key derived from a key agreement public key associated with the account and a private key provisioned to a key protection component of the server host. The operations of 710 may be performed in accordance with examples disclosed herein. In some examples, aspects of the operations of 710 may be performed by a payload component 530, as described with reference to FIG. 5.

At 715, the method may include transmitting, to the key protection component, an API request including the encrypted payload retrieved from the database, the clear text password extracted from the login request, and the key agreement public key associated with the account. The operations of 715 may be performed in accordance with examples disclosed herein. In some examples, aspects of the operations of 715 may be performed by an API request component 535, as described with reference to FIG. 5.

At 720, the method may include receiving an API response that indicates whether a hash value of the clear text password from the login request corresponds to the hash value of the user configured password for the account. The operations of 720 may be performed in accordance with examples disclosed herein. In some examples, aspects of the operations of 720 may be performed by an API response component 540, as described with reference to FIG. 5.

A method for data processing is described. The method may include: receiving, at a server host, a login request that includes a clear text password for an account associated with a tenant of a multi-tenant cloud platform; retrieving, from a database associated with the multi-tenant cloud platform, a payload stored in association with the account, the payload including a hash value of a user configured password for the account and an indication of a hashing algorithm used for generation of the hash value, where at least a portion of the payload is encrypted using a secret key derived from a key agreement public key associated with the account and a private key provisioned to a key protection component of the server host; transmitting, to the key protection component, an API request including the encrypted payload retrieved from the database, the clear text password extracted from the login request, and the key agreement public key associated with the account; and receiving an API response that indicates whether a hash value of the clear text password from the login request corresponds to the hash value of the user configured password for the account.

An apparatus for data processing is described. The apparatus may include one or more memories storing processor-executable code, and one or more processors coupled with the one or more memories. The one or more processors may be individually or collectively operable to execute the processor-executable code to cause the apparatus to: receive, at a server host, a login request that includes a clear text password for an account associated with a tenant of a multi-tenant cloud platform; retrieve, from a database associated with the multi-tenant cloud platform, a payload stored in association with the account, the payload including a hash value of a user configured password for the account and an indication of a hashing algorithm used for generation of the hash value, where at least a portion of the payload is encrypted using a secret key derived from a key agreement public key associated with the account and a private key provisioned to a key protection component of the server host; transmit, to the key protection component, an API request including the encrypted payload retrieved from the database, the clear text password extracted from the login request, and the key agreement public key associated with the account; and receive an API response that indicates whether a hash value of the clear text password from the login request corresponds to the hash value of the user configured password for the account.

Another apparatus for data processing is described. The apparatus may include: means for receiving, at a server host, a login request that includes a clear text password for an account associated with a tenant of a multi-tenant cloud platform; means for retrieving, from a database associated with the multi-tenant cloud platform, a payload stored in association with the account, the payload including a hash value of a user configured password for the account and an indication of a hashing algorithm used for generation of the hash value, where at least a portion of the payload is encrypted using a secret key derived from a key agreement public key associated with the account and a private key provisioned to a key protection component of the server host; means for transmitting, to the key protection component, an API request including the encrypted payload retrieved from the database, the clear text password extracted from the login request, and the key agreement public key associated with the account; and means for receiving an API response that indicates whether a hash value of the clear text password from the login request corresponds to the hash value of the user configured password for the account.

A non-transitory computer-readable medium storing code for data processing is described. The code may include instructions executable by one or more processors to:

receive, at a server host, a login request that includes a clear text password for an account associated with a tenant of a multi-tenant cloud platform; retrieve, from a database associated with the multi-tenant cloud platform, a payload stored in association with the account, the payload including a hash value of a user configured password for the account and an indication of a hashing algorithm used for generation of the hash value, where at least a portion of the payload is encrypted using a secret key derived from a key agreement public key associated with the account and a private key provisioned to a key protection component of the server host; transmit, to the key protection component, an API request including the encrypted payload retrieved from the database, the clear text password extracted from the login request, and the key agreement public key associated with the account; and receive an API response that indicates whether a hash value of the clear text password from the login request corresponds to the hash value of the user configured password for the account.

Some examples described herein may further include operations, features, means, or instructions for: transmitting, to the key protection component, a first message including the user configured password and the key agreement public key associated with the account; and receiving, from the key protection component, a second message including the encrypted payload and an initialization vector associated with the encrypted payload.

Some examples described herein may further include operations, features, means, or instructions for: generating the secret key using the key agreement public key in the first message and the private key provisioned to the key protection component; generating the hash value of the user configured password using the hashing algorithm; including the hash value and the indication of the hashing algorithm in the payload; encrypting the payload using the secret key and the initialization vector; and returning the encrypted payload and the initialization vector to the server host.

Some examples described herein may further include operations, features, means, or instructions for: storing the encrypted payload and the initialization vector in the database; retrieving the encrypted payload and the initialization vector from the database in response to the login request; and including the encrypted payload and the initialization vector in the API request.

In some examples described herein, the hashing algorithm used for generation of the hash value may be selected by the key protection component. In some examples described herein, the private key may be provisioned by a key distribution service that includes at least one of an HSM, or a master host, or a quorum-based key sharing service.

Some examples may further include operations, features, means, or instructions for: generating the secret key using the key agreement public key in the API request and the private key provisioned to the key protection component; decrypting the payload using the secret key and an initialization vector associated with the payload; generating a hash value of the clear text password from the login request using the hashing algorithm associated with the payload; and comparing the hash value of the clear text password to the hash value of the user configured password for the account.

Some examples described herein may further include operations, features, means, or instructions for transmitting, to the key protection component, a message including the private key wrapped by a host public key associated with the server host.

In some examples described herein, the message may be configured to cause the key protection component to unwrap the private key using a host private key associated with the server host, where the host private key is locally accessible to the key protection component.

Some examples described herein may further include operations, features, means, or instructions for storing, in the database, the private key wrapped by the host public key associated with the server host.

In some examples described herein, the database includes two or more instances of the private key wrapped by respective host public keys associated with server hosts of a sub-system of the multi-tenant cloud platform that includes the server host.

In some examples described herein, the API response includes a Boolean that indicates whether a hash value of the clear text password from the login request matches the hash value of the user configured password for the account.

In some examples described herein, the private key may be associated with a digital certificate provisioned by a CA of the multi-tenant cloud platform. In some examples described herein, the secret key may be generated using an ECDH key agreement scheme. In some examples described herein, the hashing algorithm includes SHA-256, SHA-384, SHA-512, or a Keccak algorithm.

The following provides an overview of aspects of the present disclosure:

Aspect 1: A method for data processing, comprising: receiving, at a server host, a login request that includes a clear text password for an account associated with a tenant of a multi-tenant cloud platform; retrieving, from a database associated with the multi-tenant cloud platform, a payload stored in association with the account, the payload comprising a hash value of a user configured password for the account and an indication of a hashing algorithm used for generation of the hash value, wherein at least a portion of the payload is encrypted using a secret key derived from a key agreement public key associated with the account and a private key provisioned to a key protection component of the server host; transmitting, to the key protection component, an API request comprising the encrypted payload retrieved from the database, the clear text password extracted from the login request, and the key agreement public key associated with the account; and receiving an API response that indicates whether a hash value of the clear text password from the login request corresponds to the hash value of the user configured password for the account.

Aspect 2: The method of aspect 1, further comprising: transmitting, to the key protection component, a first message comprising the user configured password and the key agreement public key associated with the account; and receiving, from the key protection component, a second message comprising the encrypted payload and an initialization vector associated with the encrypted payload.

Aspect 3: The method of aspect 2, wherein the first message is configured to cause the key protection component to generate the secret key using the key agreement public key in the first message and the private key provisioned to the key protection component; generate the hash value of the user configured password using the hashing algorithm; include the hash value and the indication of the hashing algorithm in the payload; encrypt the payload using the secret key and the initialization vector; and return the encrypted payload and the initialization vector to the server host.

Aspect 4: The method of any of aspects 2 through 3, further comprising: storing the encrypted payload and the initialization vector in the database; retrieving the encrypted payload and the initialization vector from the database in response to the login request; and including the encrypted payload and the initialization vector in the API request.

Aspect 5: The method of any of aspects 1 through 4, wherein the hashing algorithm used for generation of the hash value is selected by the key protection component.

Aspect 6: The method of any of aspects 1 through 5, wherein the private key is provisioned by a key distribution service that comprises at least one of an HSM, or a master host, or a quorum-based key sharing service.

Aspect 7: The method of any of aspects 1 through 6, wherein the API request is configured to cause a key protection component of the server host to generate the secret key using the key agreement public key in the API request and the private key provisioned to the key protection component; decrypt the payload using the secret key and an initialization vector associated with the payload; generate a hash value of the clear text password from the login request using the hashing algorithm associated with the payload; and compare the hash value of the clear text password to the hash value of the user configured password for the account.

Aspect 8: The method of any of aspects 1 through 7, further comprising: transmitting, to the key protection component, a message comprising the private key wrapped by a host public key associated with the server host.

Aspect 9: The method of aspect 8, wherein the message is configured to cause the key protection component to unwrap the private key using a host private key associated with the server host, wherein the host private key is locally accessible to the key protection component.

Aspect 10: The method of any of aspects 8 through 9, further comprising: storing, in the database, the private key wrapped by the host public key associated with the server host.

Aspect 11: The method of any of aspects 1 through 10, wherein the database comprises two or more instances of the private key wrapped by respective host public keys associated with server hosts of a sub-system of the multi-tenant cloud platform that includes the server host.

Aspect 12: The method of any of aspects 1 through 11, wherein the hashing algorithm comprises SHA-256, SHA-384, SHA-512, or a Keccak algorithm.

Aspect 13: The method of any of aspects 1 through 12, wherein the API response comprises a Boolean that indicates whether a hash value of the clear text password from the login request matches the hash value of the user configured password for the account.

Aspect 14: The method of any of aspects 1 through 13, wherein the private key is associated with a digital certificate provisioned by a CA of the multi-tenant cloud platform.

Aspect 15: The method of any of aspects 1 through 14, wherein the secret key is generated using an ECDH key agreement scheme.

Aspect 16: An apparatus for data processing, comprising one or more memories storing processor-executable code, and one or more processors coupled with the one or more memories, where the one or more processors are individually or collectively operable to execute the processor-executable code to cause the apparatus to perform a method of any of aspects 1 through 15.

Aspect 17: An apparatus for data processing, comprising at least one means for performing a method of any of aspects 1 through 15.

Aspect 18: A non-transitory computer-readable medium storing code for data processing, the code comprising instructions executable by one or more processors to perform a method of any of aspects 1 through 15.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving, at a server host, a login request that includes a clear text password for an account associated with a tenant of a multi-tenant cloud platform;

retrieving, from a database associated with the multi-tenant cloud platform, a payload stored in association with the account, the payload comprising a hash value of a user configured password for the account, a key agreement public key associated with the account, an initialization vector, and an indication of a hashing algorithm used for generation of the hash value, wherein at least a portion of the payload is encrypted using a secret key derived from the key agreement public key associated with the account and a private key provisioned to a key protection component of the server host;

transmitting, to the key protection component, an application programming interface (API) request comprising the payload retrieved from the database and the clear text password extracted from the login request; and receiving an API response that indicates whether a hash value of the clear text password from the login request corresponds to the hash value of the user configured password for the account.

2. The method of claim 1, further comprising:

providing the user configured password to the key protection component; and receiving the payload from the key protection component.

3. The method of claim 2, wherein the key protection component is configured to:

generate the secret key using the key agreement public key associated with the account and the private key provisioned to the key protection component;

generate the hash value of the user configured password using the hashing algorithm;

encrypt the hash value of the user configured password and the indication of the hashing algorithm using the secret key and the initialization vector; and include the encrypted hash value of the user configured password, the encrypted indication of the hashing algorithm, the initialization vector, and the key agreement public key in the payload.

4. The method of claim 2, further comprising:

storing the payload in the database;

retrieving the payload from the database in response to the login request; and including the payload in the API request.

5. The method of claim 1, wherein the hashing algorithm is selected by the key protection component.

6. The method of claim 1, wherein:

the private key is provisioned by a key distribution service that comprises at least one of a hardware security module (HSM), or a master host, or a quorum-based key sharing service; and the key agreement public key is generated by the key protection component.

7. The method of claim 1, wherein the API request is configured to cause the key protection component of the server host to:

generate the secret key using the key agreement public key in the API request and the private key provisioned to the key protection component;

decrypt the payload using the secret key and the initialization vector associated with the payload;

generate the hash value of the clear text password from the login request using the hashing algorithm associated with the payload; and compare the hash value of the clear text password to the hash value of the user configured password for the account.

8. The method of claim 1, further comprising:

transmitting, to the key protection component, a message comprising the private key wrapped by a host public key associated with the server host.

9. The method of claim 8, wherein the message is configured to cause the key protection component to unwrap the private key using a host private key associated with the server host, wherein the host private key is locally accessible to the key protection component.

10. The method of claim 8, further comprising:

storing, in the database, the private key wrapped by the host public key associated with the server host.

11. The method of claim 1, wherein the database comprises two or more instances of the private key wrapped by respective host public keys associated with server hosts of a sub-system of the multi-tenant cloud platform that includes the server host.

12. The method of claim 1, wherein the hashing algorithm comprises a 256-bit secure hashing algorithm (SHA-256), a 384-bit secure hashing algorithm (SHA-384), a 512-bit secure hashing algorithm (SHA-512), or a Keccak algorithm.

13. The method of claim 1, wherein the API response comprises a Boolean that indicates whether the hash value of the clear text password from the login request matches the hash value of the user configured password for the account.

14. The method of claim 1, wherein the private key is associated with a digital certificate provisioned by a certificate authority (CA) of the multi-tenant cloud platform.

15. The method of claim 1, wherein the secret key is generated using an Elliptic Curve Diffie-Hellman (ECDH) key agreement scheme.

16. An apparatus for data processing, comprising:

one or more memories storing processor-executable code; and one or more processors coupled with the one or more memories, wherein the one or more processors are individually or collectively operable to execute the processor-executable code to cause the apparatus to:

receive, at a server host, a login request that includes a clear text password for an account associated with a tenant of a multi-tenant cloud platform;

retrieve, from a database associated with the multi-tenant cloud platform, a payload stored in association with the account, the payload comprising a hash value of a user configured password for the account, a key agreement public key associated with the account, an initialization vector, and an indication of a hashing algorithm used for generation of the hash value, wherein at least a portion of the payload is encrypted using a secret key derived from the key agreement public key associated with the account and a private key provisioned to a key protection component of the server host;

transmit, to the key protection component, an application programming interface (API) request comprising the payload retrieved from the database and the clear text password extracted from the login request; and receive an API response that indicates whether a hash value of the clear text password from the login request corresponds to the hash value of the user configured password for the account.

17. The apparatus of claim 16, wherein the processor-executable code is further executable by the one or more processors to cause the apparatus to:

provide the user configured password to the key protection component; and receive the payload from the key protection component.

18. The apparatus of claim 17, wherein the key protection component is configured to:

generate the secret key using the key agreement public key associated with the account and the private key provisioned to the key protection component;

generate the hash value of the user configured password using the hashing algorithm;

encrypt the hash value of the user configured password and the indication of the hashing algorithm using the secret key and the initialization vector; and include the encrypted hash value of the user configured password, the encrypted indication of the hashing algorithm, the initialization vector, and the key agreement public key in the payload.

19. The apparatus of claim 17, wherein the processor-executable code is further executable by the one or more processors to cause the apparatus to:

store the payload in the database;

retrieve the payload from the database in response to the login request; and include the payload in the API request.

20. A non-transitory computer-readable medium storing code for data processing, the code comprising instructions executable by one or more processors to:

receive, at a server host, a login request that includes a clear text password for an account associated with a tenant of a multi-tenant cloud platform;

retrieve, from a database associated with the multi-tenant cloud platform, a payload stored in association with the account, the payload comprising a hash value of a user configured password for the account, a key agreement public key associated with the account, an initialization vector, and an indication of a hashing algorithm used for generation of the hash value, wherein at least a portion of the payload is encrypted using a secret key derived from the key agreement public key associated with the account and a private key provisioned to a key protection component of the server host;

transmit, to the key protection component, an application programming interface (API) request comprising the payload retrieved from the database and the clear text password extracted from the login request; and receive an API response that indicates whether a hash value of the clear text password from the login request corresponds to the hash value of the user configured password for the account.

* * * * *